United States Patent
Balzano et al.

(10) Patent No.: US 9,279,701 B2
(45) Date of Patent: Mar. 8, 2016

(54) METHOD AND SYSTEM FOR READING UTILITY METERS

(71) Applicant: Basic Electronics, Inc., Garden Grove, CA (US)

(72) Inventors: Alfiero F. Balzano, Garden Grove, CA (US); Armando Benavides, Los Angeles, CA (US)

(73) Assignee: Basic Electronics, Inc., Garden Grove, CA (US)

( * ) Notice: Subject to any disclaimer, the term of this patent is extended or adjusted under 35 U.S.C. 154(b) by 152 days.

(21) Appl. No.: 14/164,705

(22) Filed: Jan. 27, 2014

(65) Prior Publication Data

US 2015/0211886 A1    Jul. 30, 2015

(51) Int. Cl.
| | |
|---|---|
| G08B 29/00 | (2006.01) |
| G08C 19/16 | (2006.01) |
| G01D 4/00 | (2006.01) |
| H04Q 9/00 | (2006.01) |

(52) U.S. Cl.
CPC ............... *G01D 4/004* (2013.01); *G01D 4/008* (2013.01); *H04Q 9/00* (2013.01); *H04Q 2209/40* (2013.01); *H04Q 2209/60* (2013.01); *H04Q 2209/886* (2013.01)

(58) Field of Classification Search
CPC ... G08C 19/26; E21B 47/06; F02B 2075/027; G01D 4/004; H04Q 9/00; Y02B 90/242
USPC .............. 340/870.2, 870.4; 342/74, 114, 435; 455/115.4, 155.1, 226.4
See application file for complete search history.

(56) References Cited

U.S. PATENT DOCUMENTS

| | | | |
|---|---|---|---|
| 5,643,648 A | 7/1997 | Kobe et al. | |
| 5,691,509 A | 11/1997 | Balzano | |
| 6,193,414 B1 | 2/2001 | Balzano | |
| 6,347,915 B1 | 2/2002 | Balzano | |
| 6,388,534 B1 | 5/2002 | Balzano | |
| 6,488,532 B2 | 12/2002 | Balzano | |
| 6,509,841 B1 * | 1/2003 | Colton | G01D 4/004 340/870.11 |
| 6,657,552 B2 | 12/2003 | Belski et al. | |
| 6,739,878 B1 | 5/2004 | Balzano | |
| 6,900,738 B2 | 5/2005 | Crichlow | |
| 7,154,371 B1 | 12/2006 | Balzano | |
| 7,186,249 B1 | 3/2007 | Balzano | |
| 7,370,480 B1 | 5/2008 | Balzano | |
| 7,400,264 B2 | 7/2008 | Boaz | |

(Continued)

FOREIGN PATENT DOCUMENTS

WO    WO2015059694    4/2015

OTHER PUBLICATIONS

Hydrospin, Hydro-Power Solutions Brochure, 2 pages, Netanya, Israel, www.h-spin.com/download.

*Primary Examiner* — George Bugg
*Assistant Examiner* — Anthony D Afrifa-Kyei
(74) *Attorney, Agent, or Firm* — Stetina Brunda Garred & Brucker

(57) ABSTRACT

The present invention relates to a remote meter reading method and system of the type that may be poled by wireless communication. Other remote reading systems require a periodic change of batteries used to supply the power to the communication and other systems used in the remote meters. The present invention mitigates this need by using the water and gas flow into homes or other buildings to generate power used to recharge those batteries.

20 Claims, 14 Drawing Sheets

System Diagram

(56) References Cited

U.S. PATENT DOCUMENTS

| | | |
|---|---|---|
| 7,699,839 B2 | 4/2010 | Balzano |
| 7,712,383 B2 | 5/2010 | Peleg |
| 7,764,494 B2 | 7/2010 | Balzano |
| 7,766,330 B2 | 8/2010 | Balzano |
| 7,768,146 B2 | 8/2010 | Balzano |
| 7,862,877 B2 | 1/2011 | Balzano |
| 7,878,055 B2 | 2/2011 | Balzano |
| 7,980,143 B2 | 7/2011 | Peleg |
| 8,221,134 B2 | 7/2012 | Dove |
| 8,341,762 B2 | 1/2013 | Balzano |
| 8,353,085 B2 | 1/2013 | Balzano |
| 8,537,028 B2 | 9/2013 | Ehrke |
| 8,544,346 B2 | 10/2013 | Peleg |
| 8,622,753 B2 | 1/2014 | Balzano |
| 2001/0024165 A1* | 9/2001 | Steen, III ............... G05B 15/02 340/870.01 |
| 2003/0009301 A1 | 1/2003 | Anand et al. |
| 2007/0088462 A1 | 4/2007 | Peleg |
| 2012/0210708 A1 | 8/2012 | Dunn et al. |
| 2013/0234863 A1* | 9/2013 | Vos ....................... G01D 4/006 340/870.03 |

* cited by examiner

System Diagram

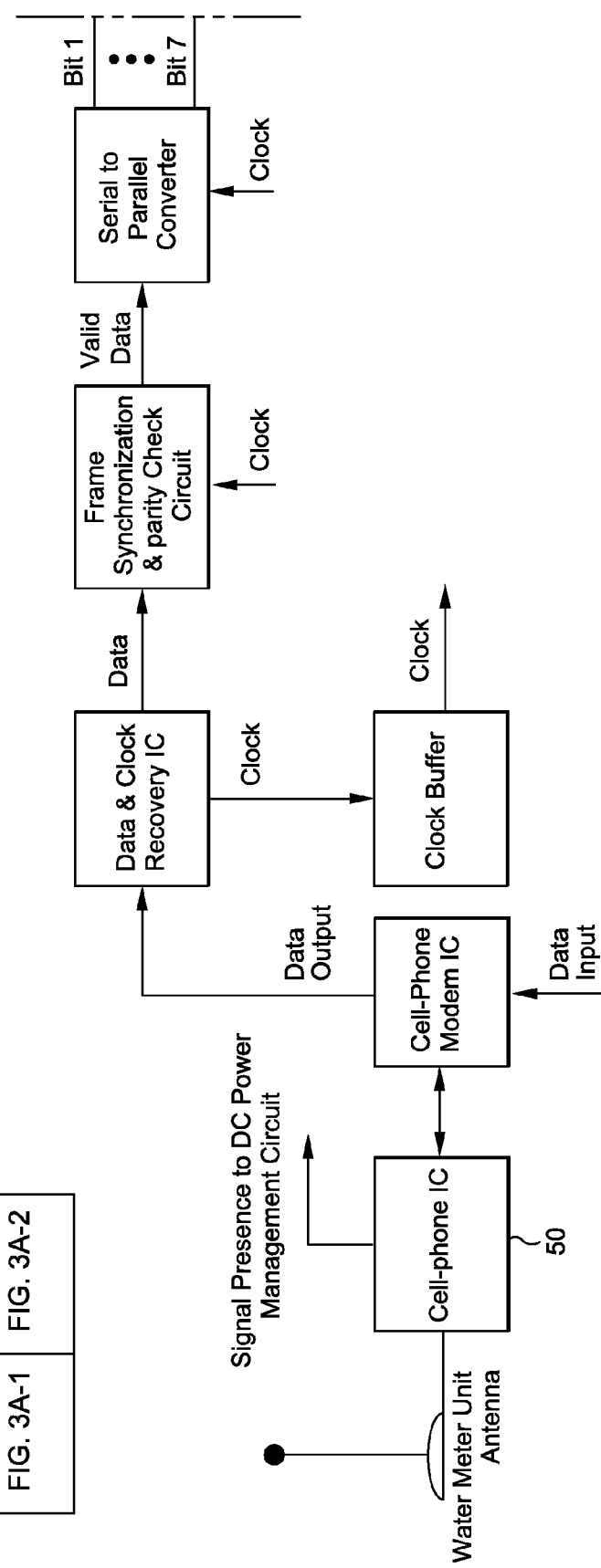
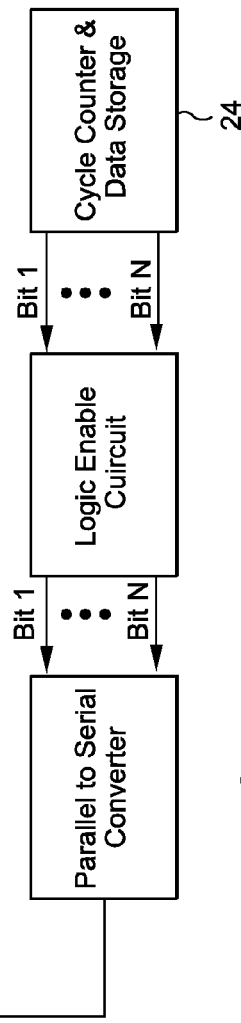
FIG. 3A
| FIG. 3A-1 | FIG. 3A-2 |
FIG. 3A-1

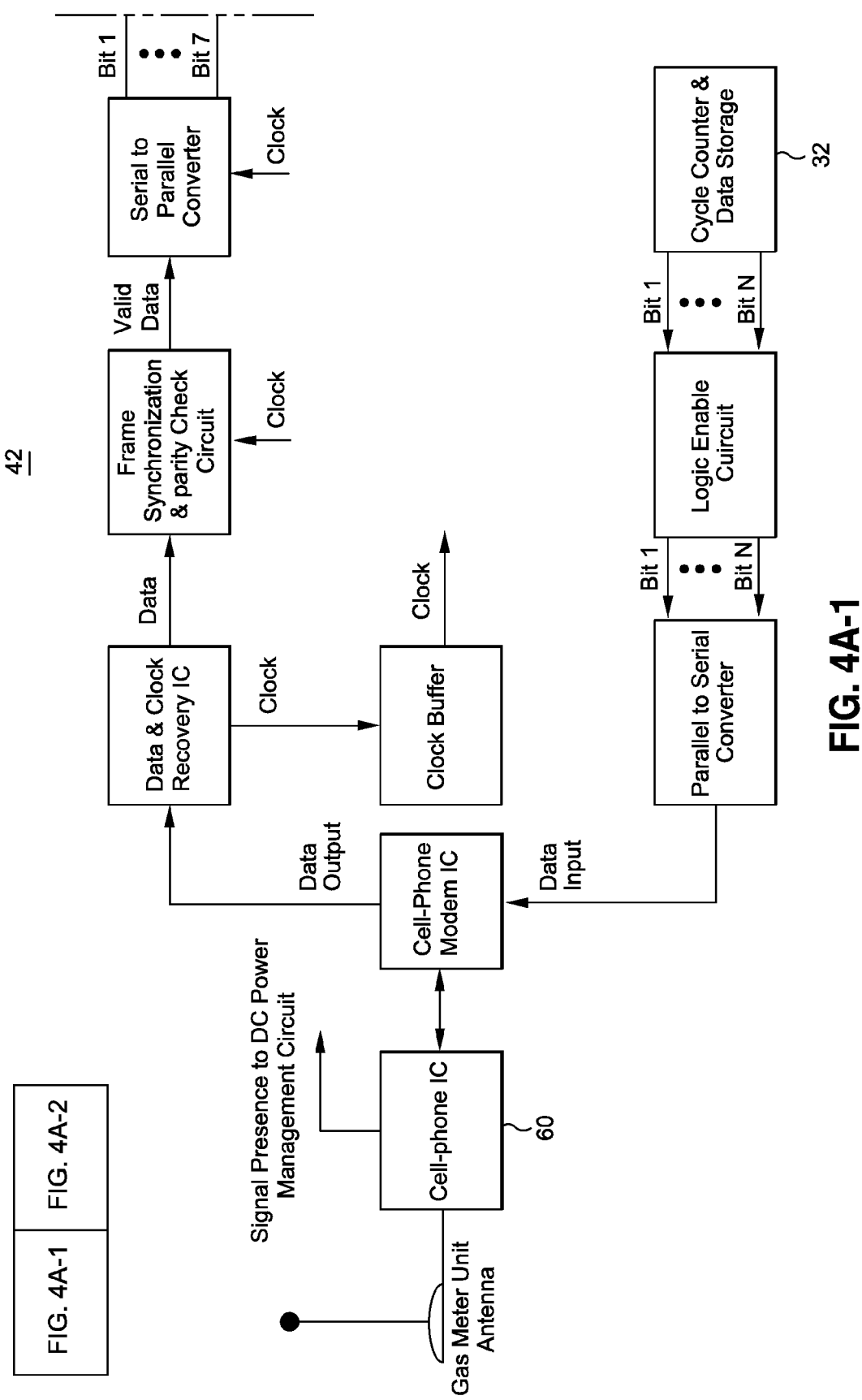

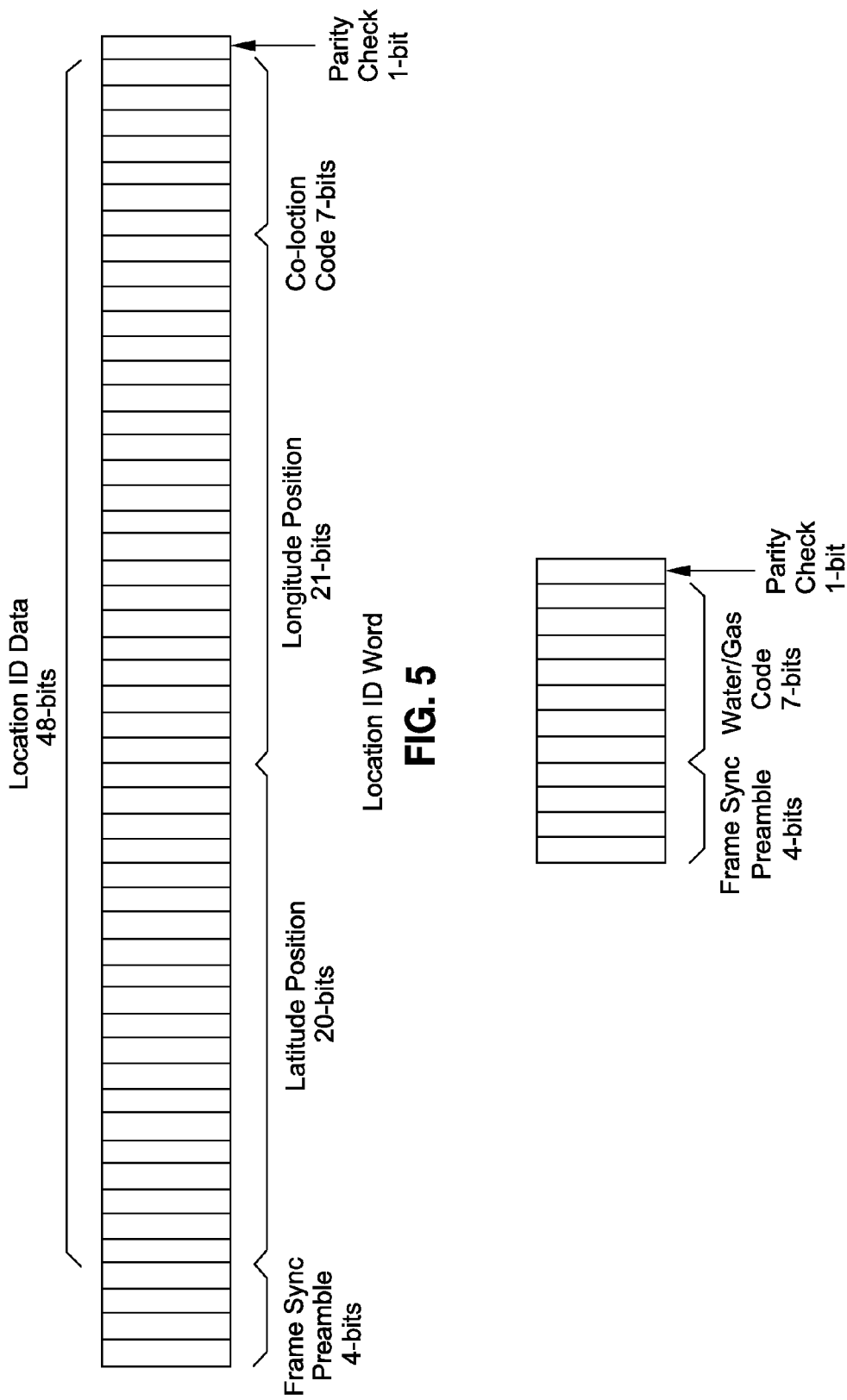

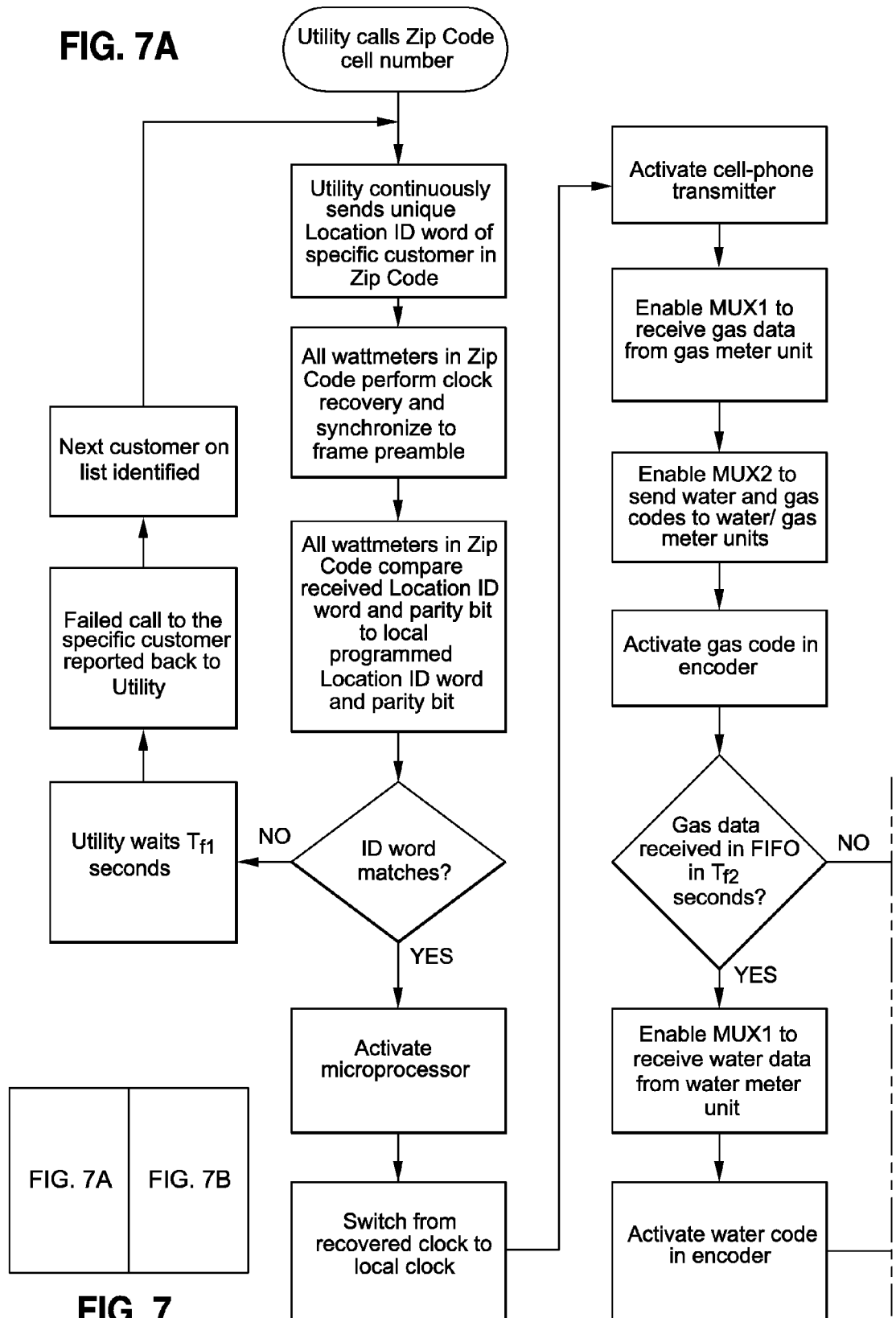

METHOD AND SYSTEM FOR READING UTILITY METERS

CROSS-REFERENCE TO RELATED APPLICATIONS

Not Applicable

STATEMENT RE: FEDERALLY SPONSORED RESEARCH/DEVELOPMENT

Not Applicable

BACKGROUND

The present invention relates to a remote meter reading method and system of the type that may be polled by wireless communication. Contemporary remote reading systems require a periodic change of batteries used to supply the power to the communication and other systems used in the remote meters. The present invention mitigates this need by using the water and gas flow into homes or other buildings to generate power used to recharge those batteries.

Meter reading techniques have evolved substantially from days when the meter readers ventured into yards and alleys to visually record meter readings. In some cases, meters may have been inaccessible for many months. Whether accessible or not, such techniques were labor intensive and slow. Moreover, such techniques typically required procurement of various types of vehicles to support the meter reading process, each vehicle having requirements for gasoline, maintenance and insurance costs. The number of employees required to implement those services was substantial, with each employee again having requirements for salaries, insurance, health benefits, etc. Moreover, the availability of meter reading services was weather dependent.

More recently some utility meters have been provided with radio communication circuits that allow the utility to poll the usage information from a meter using a local communication system in a roaming utility vehicle.

However, where communication circuits and other electronic circuits, e.g. for data acquisitions, storage transfer, are introduced, they introduce associated power requirements which must be accounted for. Commonly, this is done by providing a battery in the meter, or associated equipment, which powers the communication and any other data processing circuitry, to enable their function, i.e., to communicate usage information from a meter addressed by the inquiry.

Consequently, while the use of wireless data collection and communication circuits associated with utility meters has served to avoid the need for service personnel to make periodic on-premises meter readings, it has introduced a requirement for periodic battery servicing, and replacement, albeit less often than prior meter reading requirements.

The present invention is directed a meter reading method and system that substantially further mitigates the need for servicing the utility meters by providing a battery recharging system that can be powered by a fluid flow being measured, e.g. water flow, or gas flow.

The present invention has application for monitoring individual meters, monitoring a plurality of meters associated with a common customer, and/or monitoring networks of many meters associated with different customers and/or accounts.

The present invention is particularly well suited for networks of multiple meters where the meters are disposed in relatively close relation, e.g. within two hundred feet or less.

The present invention also has substantially use in promoting consolidated billing services for multiple utilities, where the utilities are interconnected and polled in accordance with the present invention.

BRIEF SUMMARY

A method of reading utility meters is provided for communicating with and polling a plurality of utility meters. A first meter is configured for two-way wireless communication with a phone service provider. Upon receipt of a billing inquiry at the first meter, the inquiry is then communicated from the first meter to each meter addressed by the inquiry, such as other utility meters associated with the customer. Each meter addressed by the inquiry wirelessly communicates the meter usage information stored therein to the first meter which communicates the meter usage information to the phone service provider.

Rechargeable batteries are used to power wireless communications between the utility meters, and/or between the utility meters and the phone service provider. In accordance with present invention the flow of water or gas through the utility lines is used to provide energy to recharge those batteries.

In accordance with one embodiment of the invention a fluid flow transducer is disposed in fluid communication with water flow through a water conduit. The transducer may be disposed within the water conduit, with a rotatable impeller or other component extending into at least a portion of the water flow, and generating electrical energy in response the water through the conduit. The water conduit may be a water main that is maintained by a utility company, or a privately owned water line that is maintained by a resident.

In another implementation the transducer may be implemented within a gas conduit, with components suitable to respond to lower fluid flow pressure within a gas conduit.

Usage information may be derived from the transducer operation or may be separately derived, e.g. using a device disposed external to the water conduit operative to the respond to water flow through the conduit to generate a responsive electrical signal.

A billing inquiry received at the first meter may be formatted include address information to identify one or more of the meters to which the inquiry is addressed. In one implementation, the billing inquiry is addressed to each of the utility meters. In another implementation, the inquiry may be addressed to only a single meter, for example, the first meter.

In one embodiment the first meter is the electrical meter, which monitors electricity usage. In the event that the battery is low and the transducer becomes inoperative the first meter communication circuit may draw power from the electrical line connected to the meter, e.g. where a residence has been vacant for a considerable amount of time. In other implementations the water meter or gas meter may be designated as the first meter that receives the billing inquiries from and outputs responsive information to the phone service provider.

Accordingly, the present invention allows for a utility or other service provider to wirelessly access the billing information from a plurality of utility meters, from a remote location with the meter communication and data processing circuits being powered by a rechargeable battery that may be recharged by energy derived from the flow of fluid through the associated utility conduit.

The invention has application to residential locations, as well as office complexes and other commercial buildings wherein dozens or hundreds of utility meters may be located.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 5 illustrates an exemplary signal format for signals from the phone service provider to the computer's reading system;

FIG. 6 illustrates an exemplary signal format for addressing inquiry to an individual water or gas meter;

DETAILED DESCRIPTION

As described above, contemporary remote meter reading systems rely upon a periodic change of batteries to supply power to remote meters. The present invention circumvents this need by using the water and/or gas flow into homes or other buildings to generate the power required to recharge the batteries which are needed to power the local communications systems and usage monitoring systems used in those meters.

Figure 1:
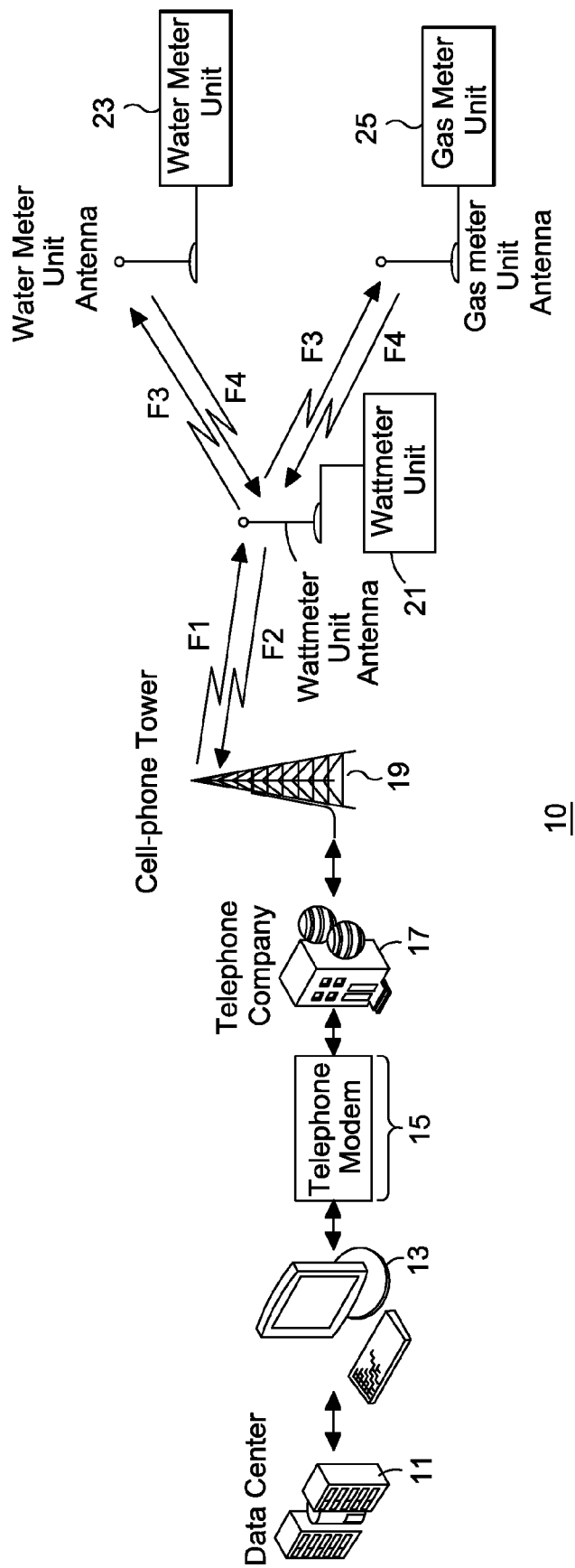
FIG. 1 is a systematic diagram of a remote utilities meter reading system in accordance with the present application.

Referring to the figures, FIG. 1 illustrates an exemplary system diagram in accordance with the present invention, where each meter location is identified by a specific location reference. In one embodiment the reference is by an address and its GPS coordinates of latitude and longitude. Location coordinate information is available in most cellphones and in electronic maps provided by a number of Government agencies and other organizations, including the U.S. Forest Service, National Geographic and Garmin™. One embodiment of the present invention is implemented by using cellphone's global positioning system (GPS) program to monitor and/or maintain a remote meter reading system.

The latitude and longitude location coordinates may be coded into a binary word of 48 bits, with a resolution of one arc second from 0° to +/−89° 59' 59" for latitude and from 0° to +/−179° 59' 59" for longitude (worldwide coverage) plus 7 more bits to address the possibility of 128 collected meters. By this process the unique location ID code is obtained for every electric meter anywhere, and this 48 bit code is programmed into read only memory (ROM) in the wattmeter unit at the time of installation. This location ID enables thousands of clients (systems) to use the same phone number, and participate in the same call, as only the wattmeter that matches the location ID code sent by the utility company (or other phone service provider) will respond to the inquiry. If the match code is successful, then the addressed wattmeter unit can proceed to retrieve water and gas consumption data from the water and gas meter units, formatting a digital word containing water, gas, and/or wattmeter data, and transmitting it back to the utility company via the phone infrastructure. The phone infrastructure may include cellphone systems, or other wireless communication systems, alone or in combination with land lines extending between the wattmeter and a location(s) where the utility company, or other phone service provider, is located. Once water/gas/electrical use information is received, the utility company or other service provider may change location ID code to that of the next client (system) on the list and repeat the process thus obtaining electrical power, water and/or gas consumption for the next client. Such changes to the location ID code may proceed in the course of a single call, or by means of serial calls, each directed to a dedicated location (system).

Because the wattmeter unit is connected to the power line, that unit is not power limited. However, the water and gas meters are not typically connected to a power line, and therefore, rely upon battery power to respond to any wireless inquiries for billing data. However, such batteries would need to periodically be replaced, which may interfere with billing activities and create a maintenance backlog. The present invention provides the means to substantially mitigate maintenance requirements associated with powering the data collection and electronic communication of billing data from the water and gas units to a utility company or other service providers.

In accordance with the present invention a higher power cellphone transceiver, or other wireless transceiver, is located at one of the water/gas/electrical meters. In the presently preferred embodiment the transceiver is associated with the electrical meter, as it has the most convenient access to the power line. The water and gas meter units are typically deposed in relatively close proximity with the wattmeter, e.g. less than two hundred feet apart, and are typically powered limited by battery power capacity. In accordance with the present invention, the water and gas meter units are supplemented with transducer units that convert water or gas flow into electrical energy which is used to recharge the batteries that power measuring and communication circuitry between those meters and the wattmeter, which in turn communicates the usage information to the utility company or other service provider. Because the water/gas meter units are located relatively close to the wattmeter, only a relatively low level power is required to communicate usage information to the wattmeter transceivers. The higher power requirements of the transceiver communication between the wattmeter and the utility company, or service provider, may be satisfied by the electrical power that is connected to the wattmeter.

FIG. 1 illustrates one exemplary embodiment of the present invention. As shown therein, the system 10 includes a data center 11, which stores water/gas/electrical usage data for billing and other purposes. The data center 11 may be maintained by one or more utility companies, or other services providers that may perform billing activities on behalf of the utility company.

In accordance with the illustrated embodiment, billing personnel may enter a billing inquiry at personal computer 13 which is communicated to phone company 17 via modem 15. The inquiry is then communicated to a cellphone tower 19, or other wireless communication system operative to wirelessly communicate the inquiry to all wattmeter transceivers within broadcast range. In the illustrated embodiment, wattmeter unit 21 receives the inquiry and processes the inquiry to determine if it is an intended recipient. If so, the inquiry may be communicated to one or both of water meter unit 23 and gas meter unit 25. In response to the inquiry water meter unit 23 and/or gas meter unit 25 will respond to the inquiry by activating measuring and communication circuitry operative to access water/gas usage data and communicate the water/gas usage data to wattmeter 21, which in turns transmit the data, which may also include wattmeter usage data, back to the cellphone tower 19, for communication to data center 11.

Figure 2A:
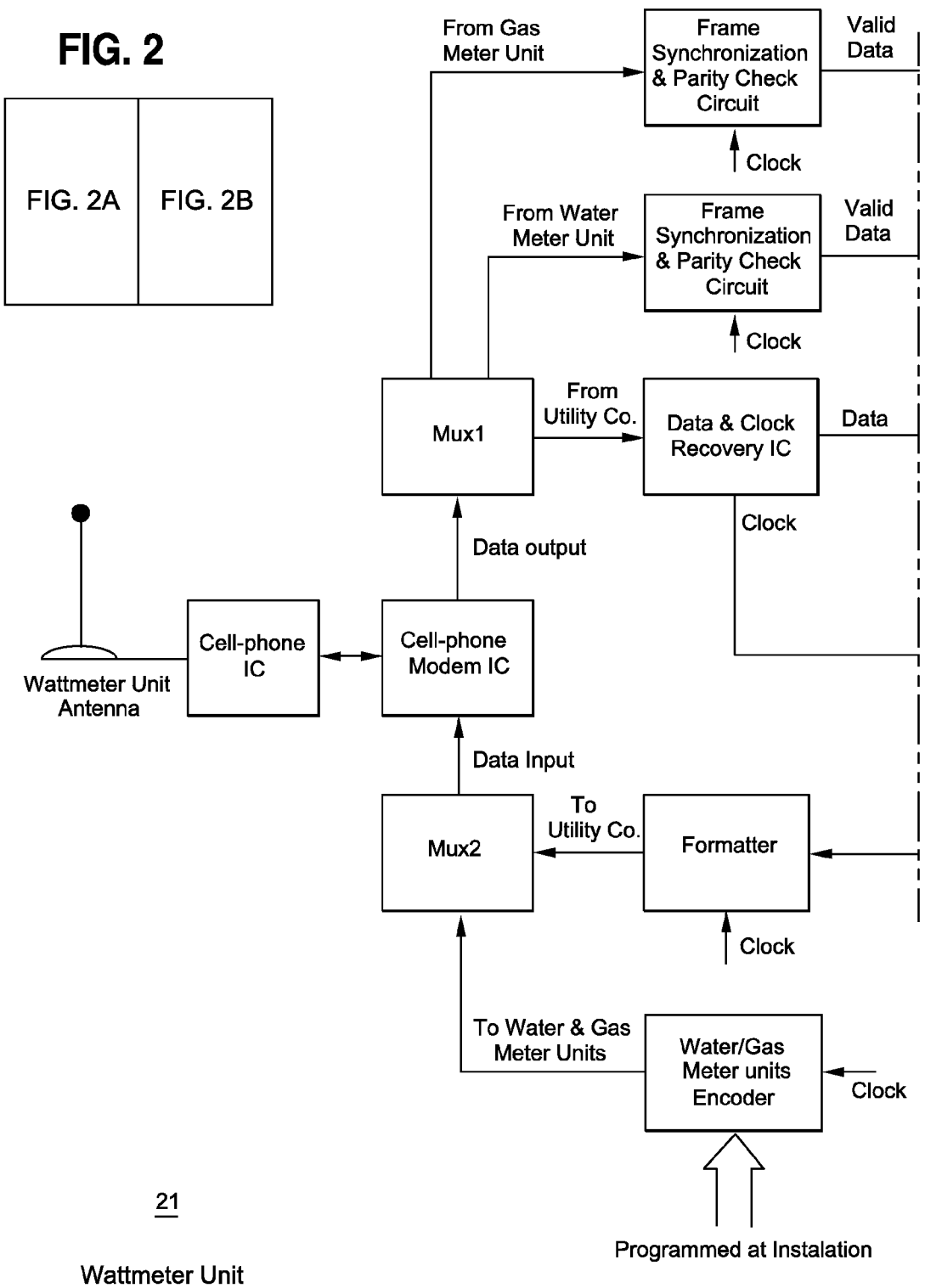
FIGS. 2A and 2B collectively form a block diagram of an exemplary wattmeter unit in accordance with the present invention.
Figure 2B:
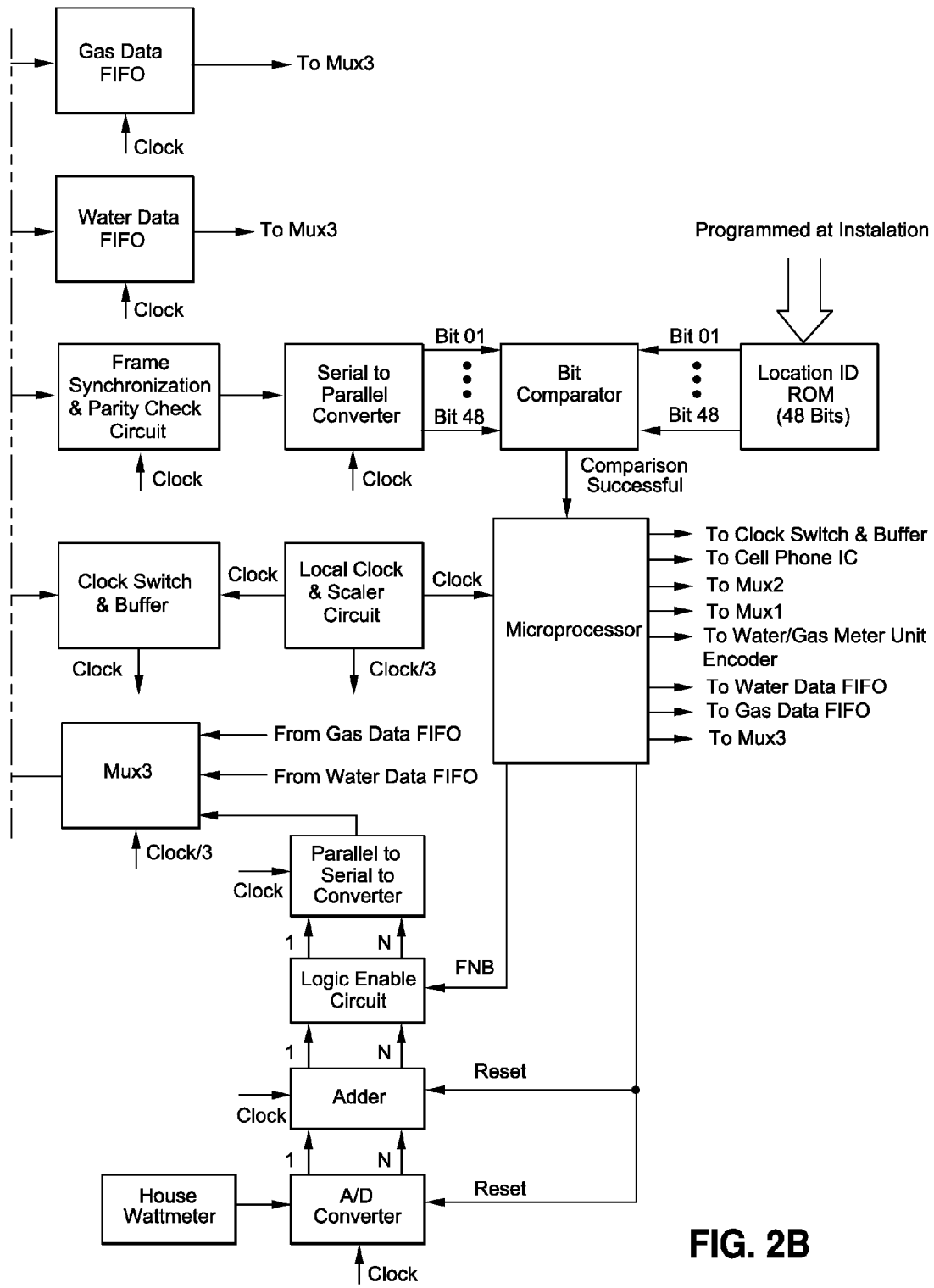
Figures 2, 3A:
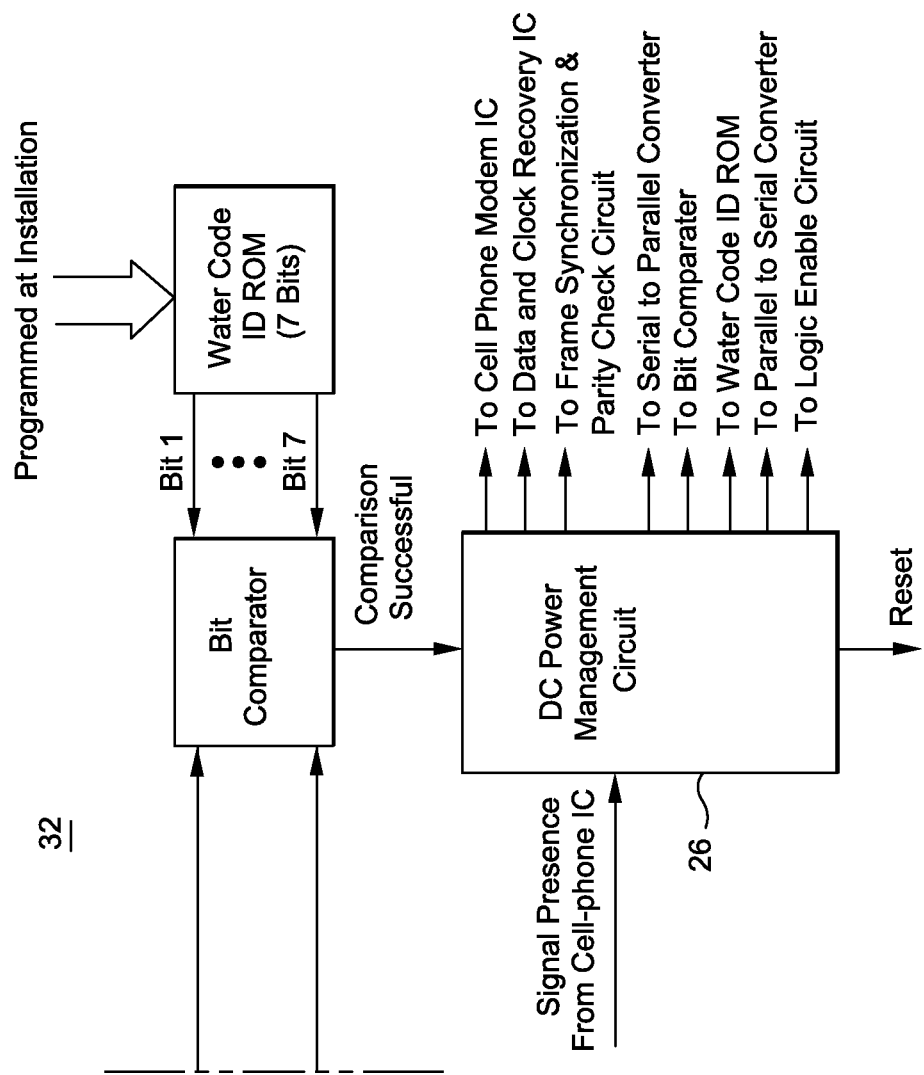
FIG. 2 illustrates the association of FIGS. 2A and 2B, to collectively form a wattmeter block diagram.
FIGS. 3A-3B are block diagrams of an exemplary water meter unit in accordance with the present invention.

FIGS. 2, 2A and 2B collectively illustrates an exemplary construction of wattmeter 21. As shown therein, the wattmeter 21 includes a wattmeter unit antenna which functions to wirelessly communicate with the cellphone tower 19, with water meter unit 23 and/or gas meter unit 25. The inquiry received from cellphone tower 19 is communicated to Mux1. The address information included in the billing inquiry is compared to the information programmed into a location ROM to determine if the inquiry is intended for wattmeter 21, water meter unit 23 and/or gas meter unit 25. If so, the microprocessor communicates a signal to water/gas meter encoder, which communicates a signal to the water and gas meter units 23, 25 via Mux2 and the wattmeter unit antenna.

In response to receipt of the billing inquiry, water meter unit 23 and gas meter unit 25 wirelessly communicates usage information to the wattmeter unit 21, as described further in connection with FIGS. 3 and 4. Upon receipt of that information, wattmeter unit 21 communicates that information to Mux1, where upon the data is validated and communicated to Mux3 for retransmission to the cellphone tower 19.

As it will be apparent to those skilled in the art, a wattmeter 21 may use different transmit and receive frequencies to communicate with the water meter unit 23 and the gas meter unit 25. In the presently preferred embodiment a seven (7) bit code is used to address the water and gas meter units individually, where the first bit is a zero (0) then the water meter unit will respond. However, if the first bit is a one (1) then the gas meter unit will respond. The remaining six (6) bits allow for sixty-four (64) collocated water and sixty-four (64) collocated gas units in the proximity of the wattmeter to respond to the inquiry.

As well also be apparent to those of ordinary skill, the water and gas units may be similar, though being programmed to have different ID codes. In the presently preferred embodiment, power consumption in the water meter unit 23 and the gas meter unit 25 is minimized by having just the receiver portion of the cellphone IC, the FLOW-GEN cycle counter and the data storage registers are constantly activated. When a call is received from the wattmeter unit (signal present) the DC power management circuit activates the receiver chain and the entire unit only if the proper ID code matches. The maximum power consumption (largest battery drain) occurs at the time of transmission (a few milliseconds) and goes back to its original state once the data transmission ends. Power demands for data transmission between the water meter 23 and/or gas meter 25 and the wattmeter 21 are typically limited because the wattmeter unit 21 is typically in the same proximity as the water meter 23 and gas meter 25. The power consumption for the wattmeter 21, however, are greater if the wattmeter needs to communicate with cellphone tower that can be miles away.

Figure 3B:
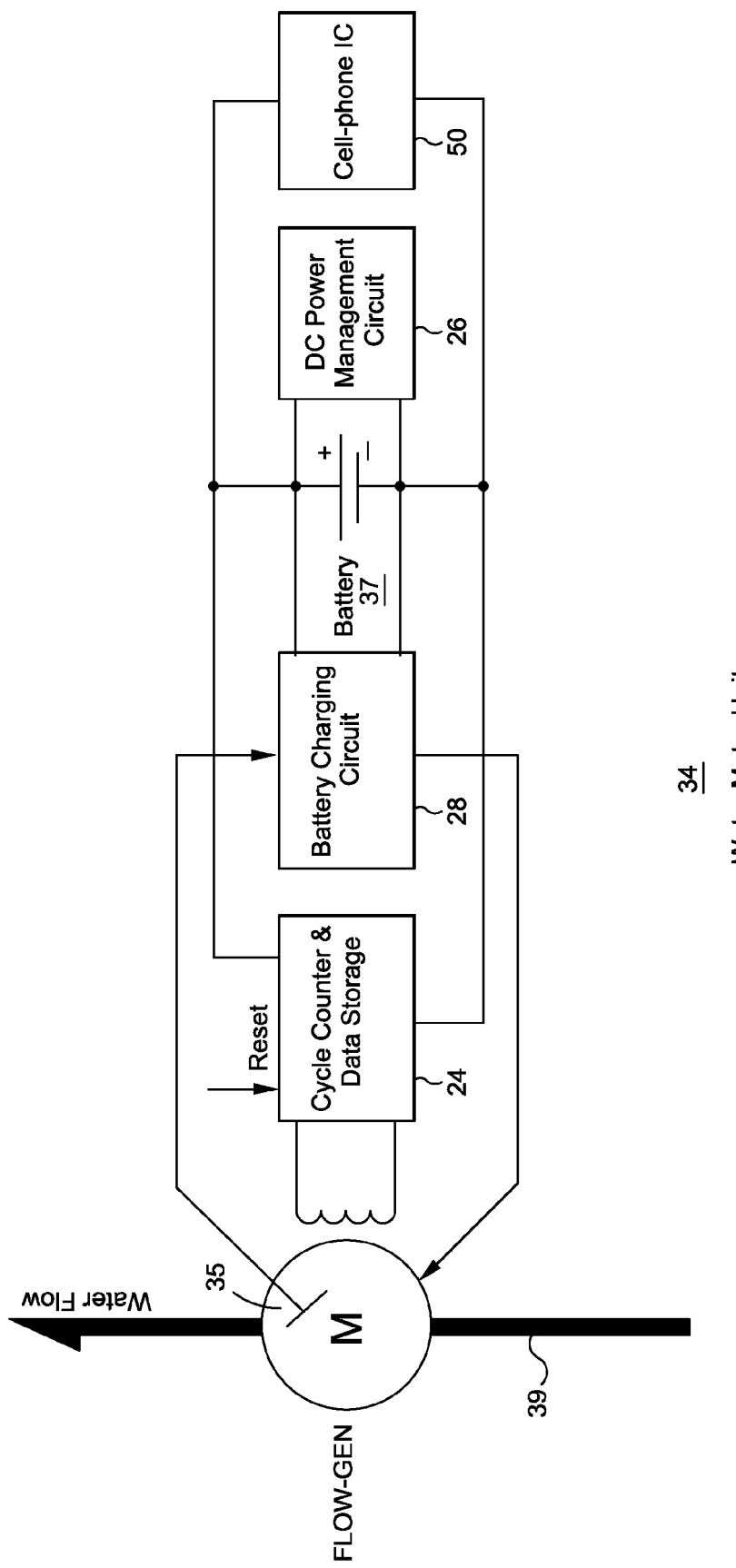
Figures 2, 4A:
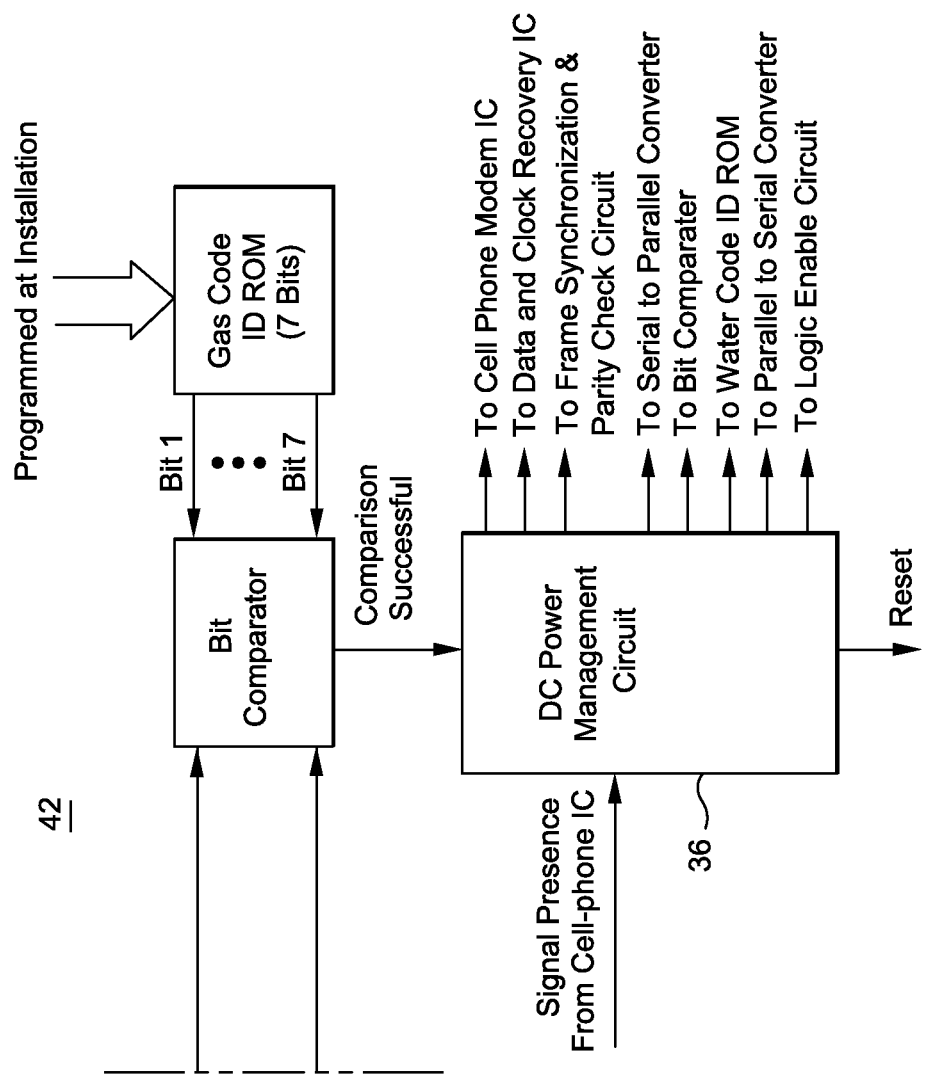
FIGS. 4A-4B are block diagrams of an exemplary gas meter unit in accordance with the present invention.

FIGS. 3A, 3A-1 and 3A-2 collectively form a block diagram illustrating the data storage and wireless communication circuit 32 of a water meter unit 34. FIG. 3B is a block diagram illustrating an exemplary transducer circuit 34 for recharging a battery used to power the circuits 32 and 34.

As shown a FIG. 1, an inquiry from data center 11 is forwarded to wattmeter unit 21, then forwarded to water meter unit 23. The communication between the wattmeter 21 and the water meter unit 23 may be implemented via a low power cellular signal, or via a local communications network, such as Bluetooth™ or Wi-Fi™. The signal received by the water meter unit 23 includes address information indicating whether it is intended for water meter unit 23, gas meter unit 25 or some other unit. The address information is compared to stored identification information pre-programmed at installation, to determine if whether the water meter unit 23 is to respond to the inquiry. Upon confirmation that the inquiry is intended for water meter unit 23, usage information stored in water meter unit 23 is communicated to the water meter unit antenna and transmitted to the wattmeter 21, for communication to the data center 11.

As noted above, battery 37 is used to power circuit 32 and may become discharged over time. FIG. 3B illustrates a circuit for charging the battery 37, to enable continued operation of wattmeter circuits 32 and 34.

As shown at FIG. 3B, water usage information may be inductively measured by transducer 35 and may be communicated to the wattmeter 21 via a cellphone IC 50. Transducer 35 may extend into the water flowing through the meter M, or associated conduit 39, such that the transducer generates an electrical battery charging signal responsive to the water flow through meter M. The charging signal is communicated to the battery charging circuit 28, for recharging the battery 37. As a result, the data storage and wireless communication circuit 32 and water meter unit 34 may operate for an extended period without the need to replace the battery providing power to the circuit. The DC power management circuit 26 functions to monitor the voltage level of battery 37, and to communicate a low voltage condition to the cellphone 50 when the voltage levels falls below a preset threshold.

Further details regarding some exemplary embodiments of transducers 35 and 45 (shown at FIG. 4B) are shown in more detailed at U.S. Pat. No. 7,768,146 (Flow Generator for Use in Connection with a Utility Conduit), assigned to the common assignee of this application, the substance of that patent is incorporated herein by reference. However, it is to be understood which alternate forms of transducers may be used to derive electrical energy from the fluid flow through, or about meter M.

FIGS. 4, 4A-1 and 4A-2 collectively form a block diagram illustrating the data storage and communication circuit 42 of a gas meter unit 25. FIG. 4B is a block diagram illustrating an exemplary transducer circuit 44 for recharging a battery used to power the circuits 42 and 44.

As shown at FIG. 1, an inquiry from data center 11, forwarded to wattmeter unit 21, is then forwarded to gas meter unit 25. The communication between the wattmeter 21 and the gas meter unit 25 may be implemented via a low power cellular signal, or via a local communications network, such as Bluetooth™ or Wi-Fi™. The signal received by the gas meter unit 25 includes address information indicating whether it is intended for gas meter unit 25, water meter unit 23 or some other unit. The address information is compared to stored identification information pre-programmed at installation, to determine if whether the gas meter unit 25 is to respond to the inquiry. Upon confirmation that the inquiry is intended for gas meter unit 25, usage information stored in gas meter unit 25 is communicated to the gas meter unit antenna and transmitted to the wattmeter 21, for communication to the data center 11.

Figure 4B:
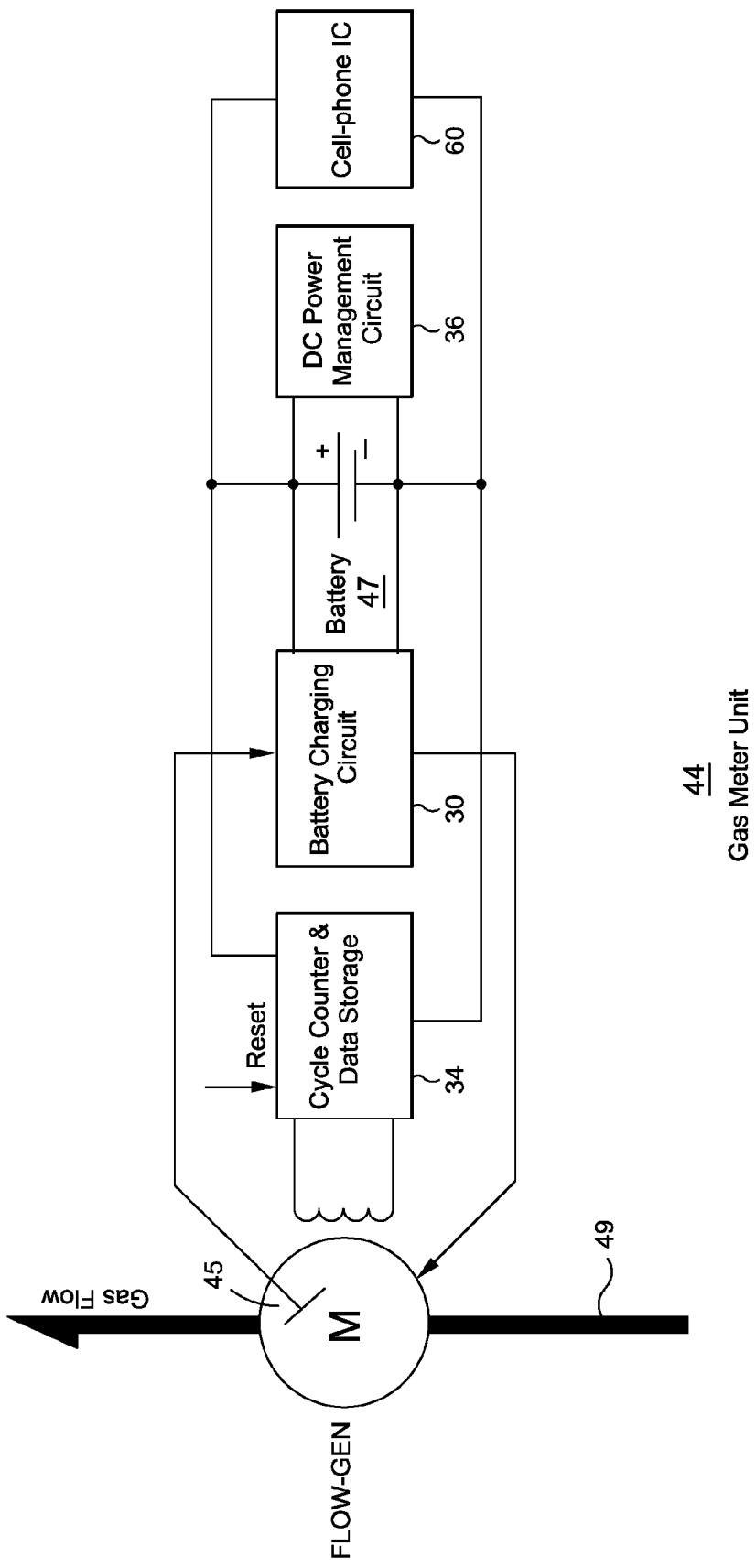

As noted above, battery is used to power circuit 42 and may become charged over time. FIG. 4B illustrates a circuit for charging the battery to enable continued operation of circuits 42 and 44.

As shown FIG. 4B, gas usage information may be inductively measured and may be communicated to the wattmeter 21 via a cellphone IC. Alternatively, a transducer 45 is formed to extend into the gas flowing through the meter M such that the transducer generates an electrical battery charging signal responsive to the gas flow through meter M, or an associated conduit 49. The charging signal is communicated to the battery charging circuit 30, for recharging the battery 47. As a result, circuits 42 and 44 may operate for an extended period without the need to replace the battery providing power to the circuit. The DC power management circuit 36 functions to monitor the voltage level of battery 47, and to communicate a low voltage condition to the cellphone 60 when the voltage levels falls below a preset threshold.

FIGS. 5 and 6 show exemplary signal formats that may be used in communications made or received in accordance with the present invention. FIG. 5 shows the format of the client location ID word transmitted by the utility company to a meter identified by GPS coordinates and a meter(s) identified by a collocation code. FIG. 6 shows the water meter or gas meter ID code word transmitted by the first meter, e.g. the wattmeter unit, to the water and/or gas meter units.

Figure 7B:
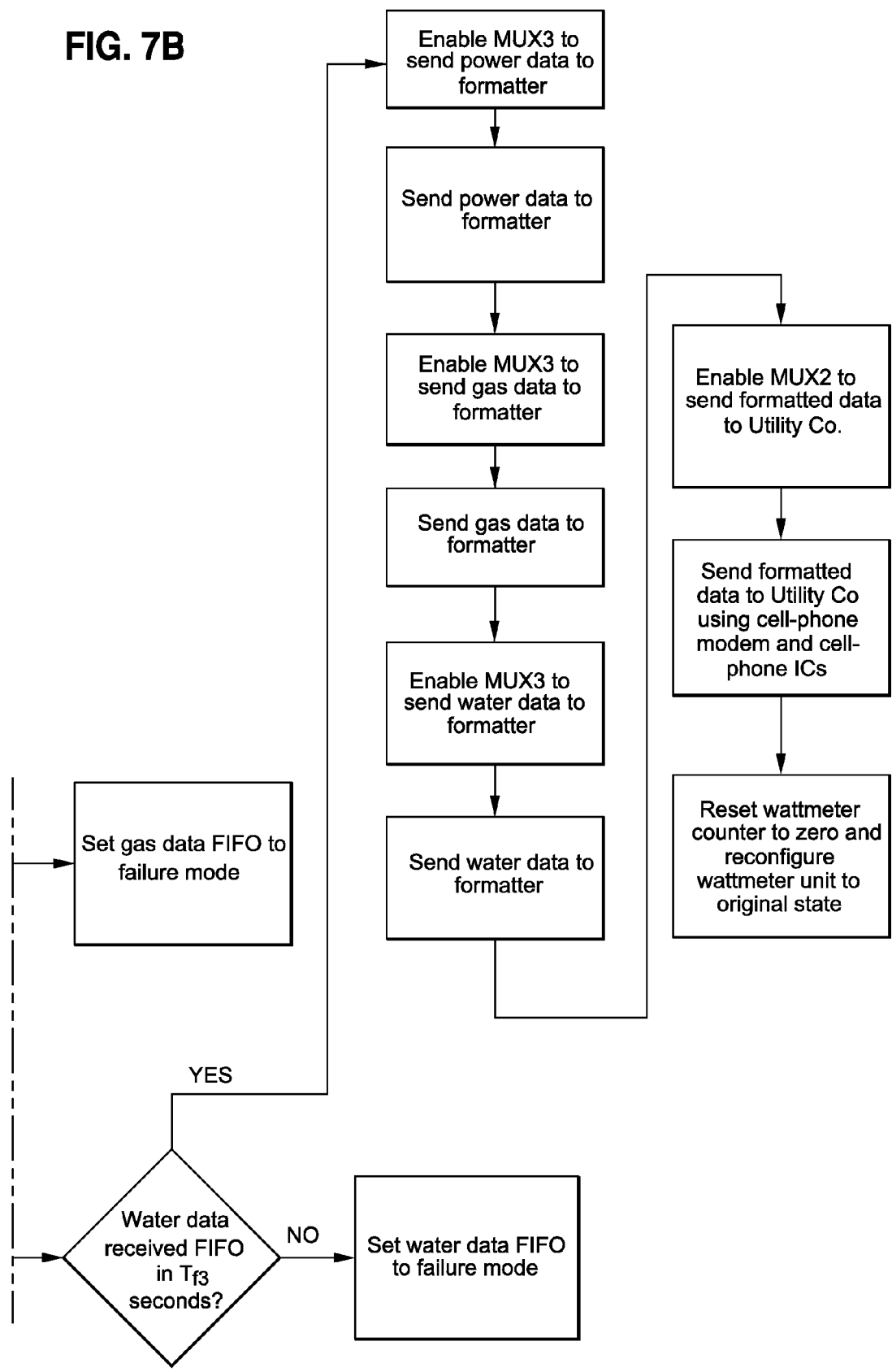
FIG. 7 illustrates the association of FIGS. 7A and 7B to collectively form a flow chart of the meter reading system FIGS. 7A and 7B collectively form a flowchart illustrating the operation of a meter's reading system in accordance with the present invention.
Figure 8:
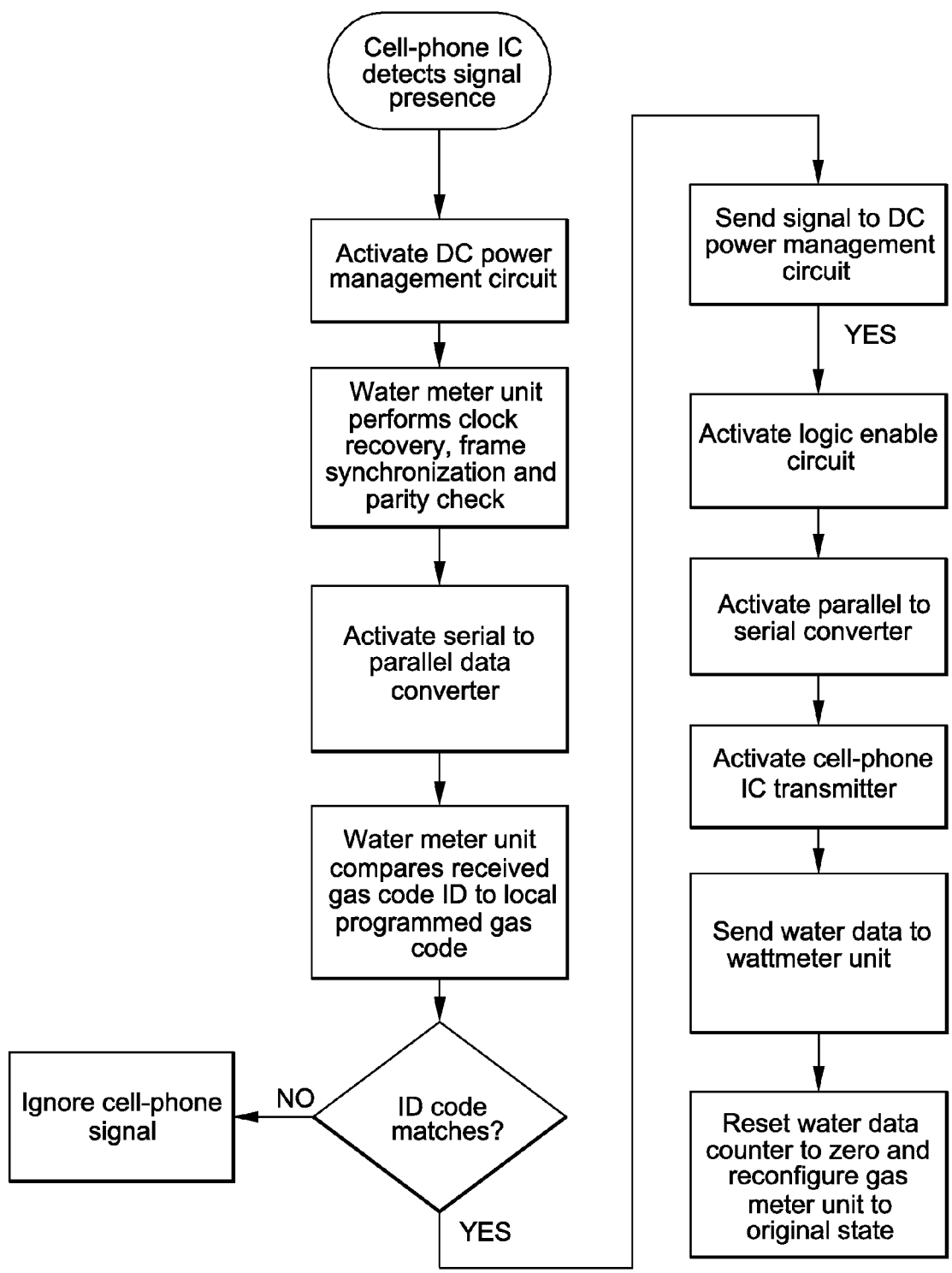
FIG. 8 is a flowchart illustrating the operation of a water meter in accordance with the present invention.
Figure 9:
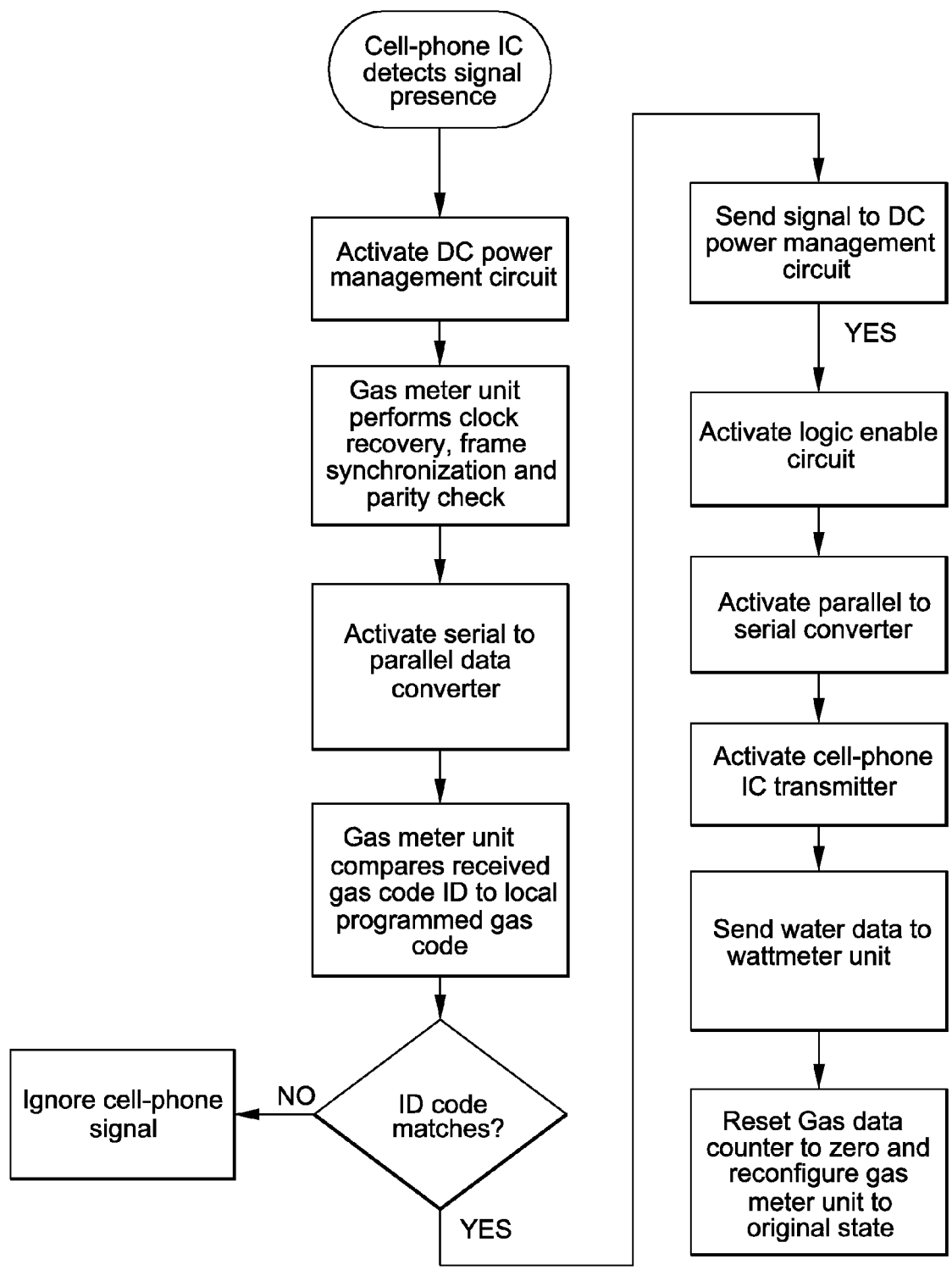
FIG. 9 is a flowchart illustrating the operation of a gas meter in accordance with the present invention.

FIGS. 7, 7A and 7B collectively form a flow chart illustrating one example of an instruction set used to regulate the operation of the wattmeter 21. FIG. 8 is a flow chart illustrating one example of an instruction set used to regulate the operation of the water meter unit 23 and FIG. 9 is a flow chart illustration one example of an instruction set used to regulate the operation of the gas meter unit 25. The sequence of steps described in FIGS. 7-9 are described in relation to the components of the wattmeter 21, the water meter unit 23 and the gas meter unit 25, as described above. As it will be apparent to those skilled in the art, the operation of water meter unit 23 is virtually identical to the operation of the gas meter unit 25.

Advantages associated with the present invention include the following:
- elimination of need for procurement of vehicles used in meter reading;
- elimination of gasoline, maintenance and insurance costs of those vehicles;
- elimination of the contaminants emission into the atmosphere generated by those vehicles;
- elimination of need to field meter-reading employees and associated salaries, insurance and health benefits;
- ability to access remote locations where a cellphone signal can reach, regardless of weather conditions;
- fixed costs relatively inflation free, as cost of phone calls increases little over time;
- low cost of units which utilize common electronics and do not require custom or high-tech parts;
- fluid flow transducer (for charging battery) can also provide usage data for associated meter;
- usage data for electric power, water, and gas consumption for a user may be obtained virtually simultaneously;
- one phone number can access thousands of users/accounts, eliminating number proliferation; and
- system applicability and scalability throughout the world.

Data storage fees associated with the present invention are also expected to be non-inhibiting. Utility companies or other data collection service provider can purchase a thumb drive having, tens of Gigabits of memory are available for tens of dollars, PC modems (cards or self-standing) can be purchased today for approximately $100.00.

Cellphone chips and modems can be purchased today for a few dollars in large quantities and rest of the electronics in the wattmeter, water and gas measurement units cost a few cents in large quantities.

At of unit installation a laptop computer or other device with access to GPS coordinates of its location may be used to set up the location ID codes. The laptop computer can be programmed to select the operation frequencies, i.e. the F3 and F4 frequencies in such a way that they may only repeat if the distance between users is greater than a certain minimum.

The assignment of the phone numbers can be such that the same number is used by all the clients in an area or area code, this phone number also needs to be programmed in the wattmeter unit at the time of installation.

The above description and statement of advantages are given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method for reading utility meters comprising of:
   configuring a plurality of utility meters, at a common location, for two-way local communication between the meters;
   configuring a first meter of the plurality of utility meters for wireless two-way communication with a phone service provider;
   receiving a billing inquiry from the phone service provider at the first meter, the billing inquiry including destination information identifying at least one of the plurality of meters to which the billing inquiry is addressed;
   wirelessly communicating the billing inquiry from the first meter to each meter addressed by the inquiry;
   in response to receipt of the billing inquiry from the first meter, accessing utility usage information stored in each meter addressed by the inquiry;
   wirelessly communicating the utility usage information stored in each meter addressed by the billing inquiry to the first meter;
   wirelessly communicating the utility usage information from the first meter to the phone service provider;
   deriving energy to power at least one meter addressed by the inquiry from a fluid flow transducer disposed in fluid communication with a fluid flowing through a utility conduit associated with at least one meter;
   providing a battery operated wireless communication circuit and a battery recharging circuit in association with at least one meter, the battery recharging circuit being in communication with the fluid flow transducer, the fluid flow transducer being disposed in fluid flow communication with fluid flow through a utility conduit associated with at least one meter, for recharging the battery in response to fluid flow through the conduit; and
   monitoring a battery voltage level within the battery operated wireless communication circuit, in at least one meter, and communicating a low voltage condition signal to the first meter when the battery voltage level falls below a preset threshold.

2. The method as recited in claim 1, wherein the step of wirelessly communicating the billing inquiry from the first meter to each meter addressed by the inquiry comprises wirelessly communicating the billing inquiry from the first meter to each of the remaining plurality of utility meters.

3. The method as recited in claim 2, wherein in response to communication of the billing inquiry to each of the remaining plurality of meters, only the meter(s) addressed by the billing inquiry accesses stored usage information and wirelessly communicates the stored usage information to the first meter.

4. The method as recited in claim 3, wherein only one of the plurality of the remaining meters is addressed by the billing inquiry.

5. The method as recited in claim 3, wherein each of the plurality of the remaining meters is addressed by the billing inquiry.

6. The method as recited in claim 5, wherein upon receipt of the usage information from each of the plurality of the remaining meters addressed by the billing inquiry, the first meter combines and wirelessly communicates the received usage information from the plurality of meters directly to the phone service provider.

7. The method as recited in claim 5, wherein the plurality of meters includes a water meter, a gas meter and an electrical meter, for measuring electricity use.

8. The method as recited in claim 1 wherein the step of providing a battery operated wireless communication circuit and a battery recharging circuit in association with at least one meter comprises providing a battery operated wireless communication circuit and a battery recharging circuit in association with a second of the plurality of utility meters, the battery recharging circuit being in communication with the fluid flow transducer, the fluid flow transducer being disposed in fluid flow communication with fluid flow through a utility conduit associated with the second meter, for recharging the battery in response to fluid flow through the conduit associated with the second meter.

9. The method as recited in claim 8, wherein the first meter is an electrical meter for measuring electricity usage.

10. The method as recited in claim 9 wherein the second meter is a water meter.

11. The method as recited in claim 10, further including the step of providing a battery operated wireless communication circuit and a battery recharging circuit in association with the water meter, the fluid flow transducer being disposed in fluid communication with water flow through the water conduit, for recharging the battery in response to water flow through the conduit.

12. The method as recited in claim 11, further comprising the step of monitoring a fluid flow transducer output signal in response to the water flow, and deriving water usage information therefrom.

13. The method as recited in claim 8, wherein the second meter is a gas meter.

14. The method as recited in claim 13, further including the step of providing a battery operated wireless communication circuit and a battery recharging circuit in association with the gas meter, the fluid flow transducer being disposed in fluid communication with gas flow through a gas conduit for recharging the battery in response to gas flow through the conduit.

15. The method as recited in claim 14, further comprising the step of monitoring a fluid flow transducer output signal in response to gas flow, and deriving gas usage information therefrom.

16. The method as recited in claim 1, further including the step of communicating the low voltage condition signal from the first meter to the phone service provider.

17. The method as recited in claim 8, further comprising the step of communicating the meter usage information from the phone service provider to a remote data center for tabulation and billing.

18. The method as recited in claim 17, further comprising the step of generating the billing inquiry at the remote data center and communicating the billing inquiry to the phone service provider.

19. The method as recited in claim 1 wherein the first meter combines utility usage information stored in the meter(s) addressed by the billing inquiry, and wirelessly communicates the combined stored usage information directly to the phone service provider.

20. The method as recited in claim 2 further comprising the step of deriving energy to power each of the remaining plurality of utility meters, from a fluid flow transducer disposed in fluid communication with the fluid flowing through a utility conduit associated with each of the respective remaining plurality of utility meters.

* * * * *